(12) United States Patent
Lowry et al.

(10) Patent No.: US 8,589,358 B2
(45) Date of Patent: Nov. 19, 2013

(54) MECHANISMS TO SHARE ATTRIBUTES BETWEEN OBJECTS

(75) Inventors: Lee Edward Lowry, Orem, UT (US); Brent Thurgood, Spanish Fork, UT (US); Rajesh Vasudevan, Sandy, UT (US); Stephen R Carter, Spanish Fork, UT (US)

(73) Assignee: EMC Corporation, Hopkinton, MA (US)

( * ) Notice: Subject to any disclaimer, the term of this patent is extended or adjusted under 35 U.S.C. 154(b) by 1007 days.

(21) Appl. No.: 12/146,550

(22) Filed: Jun. 26, 2008

(65) Prior Publication Data

US 2010/0017434 A1    Jan. 21, 2010

(51) Int. Cl.
*G06F 17/30* (2006.01)
(52) U.S. Cl.
USPC .......................... 707/687; 707/704; 707/705
(58) Field of Classification Search
USPC .......................................... 707/687, 704, 705
See application file for complete search history.

(56) References Cited

U.S. PATENT DOCUMENTS

| 5,784,620 | A | 7/1998 | Isham |
| 6,032,153 | A | 2/2000 | Sadiq et al. |
| 6,141,720 | A | 10/2000 | Jeffords et al. |
| 6,542,885 | B1 * | 4/2003 | Nally et al. ............................. 1/1 |
| 6,571,276 | B1 * | 5/2003 | Burns et al. .................... 709/212 |
| 7,017,160 | B2 | 3/2006 | Martin et al. |
| 7,086,048 | B1 | 8/2006 | Rau et al. |
| 2002/0120819 | A1 * | 8/2002 | Hickson ......................... 711/152 |
| 2003/0130999 | A1 * | 7/2003 | Probert et al. ..................... 707/3 |
| 2004/0143563 | A1 * | 7/2004 | Saake et al. ........................ 707/1 |
| 2004/0175157 | A1 * | 9/2004 | Johnson ......................... 386/125 |
| 2005/0028008 | A1 * | 2/2005 | Kumar ........................... 713/200 |
| 2005/0102670 | A1 * | 5/2005 | Bretl et al. ......................... 718/1 |
| 2005/0218739 | A1 * | 10/2005 | Maddin et al. ................. 310/120 |
| 2005/0240773 | A1 * | 10/2005 | Hilbert et al. ................. 713/182 |
| 2006/0026264 | A1 * | 2/2006 | Chesley et al. ............... 709/218 |
| 2006/0090049 | A1 * | 4/2006 | Saika ............................. 711/162 |
| 2006/0136677 | A1 * | 6/2006 | Fuhs et al. .................... 711/147 |
| 2007/0094431 | A1 * | 4/2007 | Fachan .......................... 710/200 |
| 2007/0198978 | A1 * | 8/2007 | Dice et al. ..................... 718/100 |
| 2008/0072238 | A1 | 3/2008 | Monnie et al. |
| 2010/0005138 | A1 * | 1/2010 | Manzano ...................... 709/203 |
| 2010/0070957 | A1 * | 3/2010 | Mariani et al. ................ 717/148 |

OTHER PUBLICATIONS

Article entitled "Novell Teaming 1.0 User Guide", dated Jun. 25, 2008 by Novell.*

* cited by examiner

*Primary Examiner* — Mahesh Dwivedi
(74) *Attorney, Agent, or Firm* — Barry N. Young

(57) ABSTRACT

Mechanisms for sharing attributes between objects are provided. An object includes a special designation for at least one component, which is identified as a shared attribute. Data associated with the shared attribute is populated and managed from a central location within a processing environment. Multiple instances of a same object or of entirely different objects can reference, declare, and use the data from the central location.

10 Claims, 4 Drawing Sheets

MECHANISMS TO SHARE ATTRIBUTES BETWEEN OBJECTS

BACKGROUND

Collaborative environments are becoming pervasive in the industry. One area of collaboration that is critical to an enterprise is that which is associated with new software development. During software development a variety of different developers can be working on the same or dependent modules at the same time and in entirely different processing environments.

When this occurs, each developer may be working on a different piece of the module but all the data and all the contents associated with each instance of the dual-checked out model are separately created in duplicate within memory and provided as separate independent copies to each developer.

Essentially, in a traditional versioning control or team environment data is stored on a per-instance basis for objects. This presents problems, such as inefficiency when the data that is set on one instance is shared or replicated in the other instances. In such a case, each instance has to get stamped with the changed data to keep things in synchronization.

This also results in a lot of additional memory overhead in the model environment at runtime. It also creates additional file overhead in that one has to keep saving out changes as they occur to multiple file instances. So, one update ends up causing a lot of file updates, which can degrade performance and cause tension because of the resulting file merges that have to occur, which would otherwise be unnecessary.

Even in object model environments with super class objects, the data in the super class is still saved to each instance derived and instantiated off that super class.

Thus, improved mechanisms are needed for data between objects in a team or project environment.

SUMMARY

In various embodiments, mechanisms to share attributes between objects are provided. More specifically, and in an embodiment, a method is provided for object attribute sharing. During a load process of a first object, a first attribute that is associated with shared data is identified. Next, the shared data is populated into a separate location, within the processing environment that is separate from remaining data associated with the first object, which is being loaded. Finally, a second object is serviced along with the first object with the shared data from the separate location while the first and second objects process within the processing environment.

DETAILED DESCRIPTION

Figure 1:
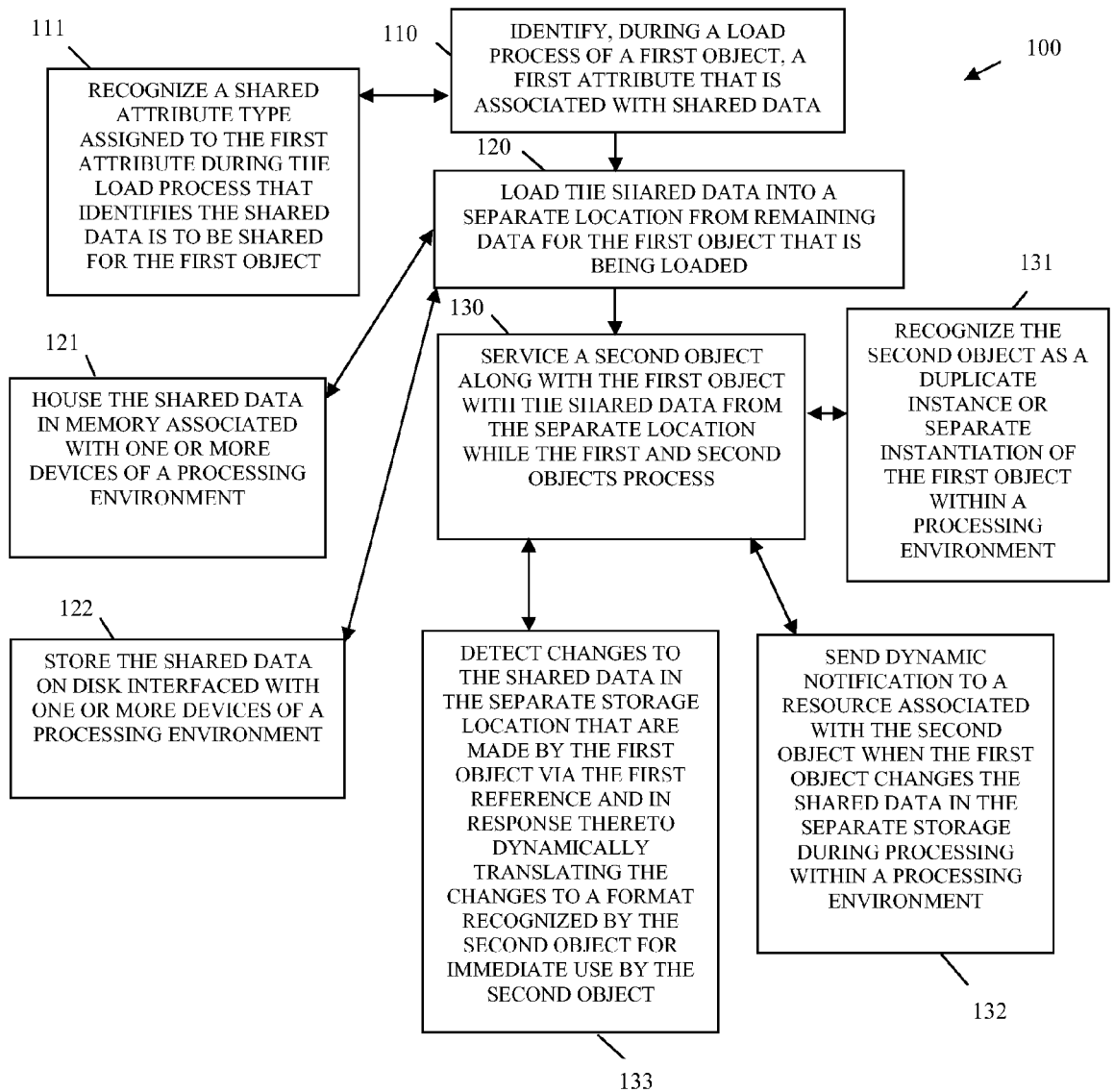
FIG. 1 is a diagram of a method for object attribute sharing, according to an example embodiment.

A "resource" may include a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

A "software module" is a particular type of resource that processes as instructions on a machine, such as a computer. The phrase "software module" and the term "object" may be used interchangeably herein and below. Thus, an object is a set of instructions implemented on a computer-readable storage medium that processes on a computer.

Also, as used herein an "object" may also be used interchangeably with the usage of "resource." Another type of resource, such as a file, can be used to physically define the object. The file includes metadata or a schema for the object. As defined herein, the files do not include parent-child (usage of the term "parent" may also include "containment") dependencies that are relied upon to establish inter-object dependencies; rather, the mechanisms presented herein and below define, manage, and establish hierarchical relations between objects via a physical storage organization of the files.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

A "project processing environment" is a processing environment in which any portion (resource) of a project processes within. So, some portions of a project may process within the project processing environment whereas other options of the project use different processing environments.

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

FIG. 1 is a diagram of a method 100 for object attribute sharing, according to an example embodiment. The method 100 (hereinafter "attribute sharing service") is implemented as instructions in a machine-accessible and readable medium. The instructions when executed by a machine (processor and memory enabled device, such as a computer, etc.) perform the processing depicted in the FIG. 1. The attribute sharing service is also operational over and processes within a network. The network may be wired, wireless, or a combination of wired and wireless.

As will be more fully described herein and below, the attribute sharing service data associated with objects to be shared in memory or on file in a seamless manner between the objects.

At 110, the attribute sharing service is available and processes during a load process for objects in a team and project-enabled processing environment. So, when a first object is loaded into the processing environment, the attribute sharing service identifies special first attributes that are to be associated with shared data. Shared data is content data or instruction data that is not stamped and is not provided as copies to individual instances of objects; rather, with shared data the data is centrally accessed and managed between multiple instances of objects within the processing environment. There is one copy of shared data that is being managed and concurrently accessed by multiple processing objects within the processing environment.

In an embodiment, at 111, the attribute sharing service recognizes a shared attribute type assigned to the first attribute during the load process. This specially recognized attribute type permits the attribute sharing service to identify the shared data and shared attribute for the first object being loaded within the processing environment.

It is to be understood that other mechanisms may be used as well, such as separate tables, profiles, schemas, or policies that specifically identify attributes of objects as being shared attributes. In each case, the attribute sharing service is designed to identify the shared attributes and load and process the shared attributes and data in the manners discussed herein and below.

At 120, the attribute sharing service loads/populates the shared data into a separate location within the processing environment. By separate location it is meant that other component pieces of the first object being loaded (those pieces not designated as being a shared attribute) are each logically populated as a unit and as a copy with the first object, whereas the shared data is maintained separately and independently as one master version that is then accessible and shared with other instances of the first object or with other objects entirely.

According to an embodiment, at 121, the attribute sharing service houses the shared data in memory associated with one or more devices of the processing environment. That is, the shared data is accessible via cache and/or random access memory (RAM). This improves processing throughput associated with sharing the data.

In still another case, at 122, the attribute sharing service stores the shared data on disk. The disk is interfaced with one or more devices of the processing environment.

A combination of embodiments may be used as well, such that the shared data is both managed from memory and on file or disk.

At 130, the attribute sharing service ensures that it services a second object along with the first object with the shared data from the separate location while the first and second objects process within the processing environment. A variety of different mechanisms can be used to ensure concurrent access and locking techniques used for concurrent volatile operations. In other words, non volatile operations are simply serviced from the separate location whereas volatile operations entail locking approaches to ensure each volatile operation is atomic. Any such concurrent access approach can be used with the attribute sharing service.

In an embodiment, at 131, the attribute sharing service recognizes the second object as a duplicate instance or separate instantiation of the first object within the processing environment. So, different versions of the first object or different implementation instances can be processing within the processing environment and yet each instance shares the same data via the separate location for its shared attribute component.

In yet another situation, at 132, the attribute sharing service sends a dynamic notification to a resource, which is associated with the second object, when the first object changes the shared data within the separate storage during processing within the processing environment. In other words, a resource, such as a user or automated application, may desire to be notified when the shared data is changed. The resource is processing or using the second object that is linked to the shared data via a shared attribute of the second object. The resource may have registered for notification of changes in advance. In this situation, the attribute sharing service sends a notification (via any configured communication channel (email, text message, voice message, web posting, etc.)) to the resource when the shared data is changed.

In a particular situation, at 133, the attribute sharing service detects changes to the shared data that are made within the separate storage by the first object via the first reference. In response to this, the attribute sharing service dynamically translates the changes into a format recognized by a second object for immediate use by the second object. So, suppose the shared data is a block of software instructions being used in one language by the first object and suppose they are changed but the second object that shares those instructions rely on a second language. Here, the attribute sharing service can perform automated translation from the first language to the second language expected by the second object and can push the changes in a dynamic and real-time fashion to the second object when the first object makes the changes to the shared data (instructions).

Figure 5:
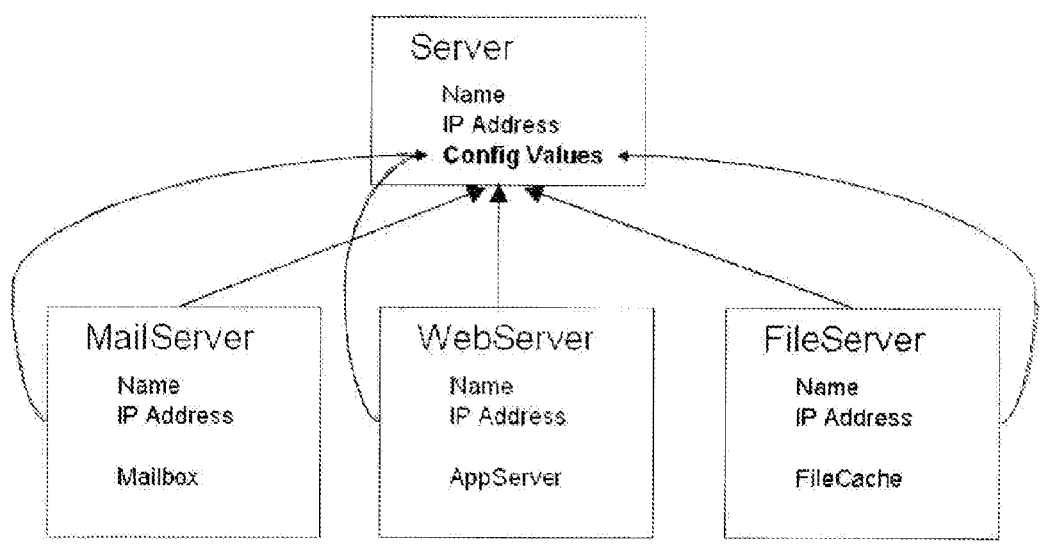
FIG. 5 is a diagrammatic view that illustrates an example of aspects of an attribute sharing service in accordance with the invention.

FIG. 5 illustrates an example to assist in comprehending the various aspects of the attribute sharing service. It is noted that this is but one example implementation and is not intended to limit the invention to any particular embodiment or implementation.

The solution to this is to allow a chunk of data (an image, text, XML, etc.) to be represented in an attribute that a resource wants to use over and over again across multiple instances. Another way of saying this is the ability to declare an attribute as a "Shared Attribute" for an object resource.

When each model object is materialized into memory at runtime, the attribute sharing service pulls together all the shared pieces for the object automatically and represents it as a single object dynamically. The attribute sharing service ensures that either 1) each object gets its own stamp of the shared attributes in the model object, or 2) has the ability to de-reference to a shared chunk of memory that contains the settings—which may be the most desirable situation for memory reasons.

Scenario #1

The following illustrates how such a relationship can be represented in model extensible markup language (XML) files in the case where all concrete instances inherit the shared data:

```
Server File
   <Object name="Server" type="Server" abstract="true">
   <attributes>
      <attr name="ConfigValues" value="<huge blob of data>"/
   </attributes>
   <attrSet name="Storage1">
      <attr name="StorageAddress" value="<huge blob of data>"/>
   </attrSet>
      <attrSet name="Storage2" inherits Storage1>
      <attr name="Storage Port" value="<huge blob of data>"/>
   </attrSet>
   </Object>
MailServer File
   <Object name="MailServer1" type="MailServer" inherits="Server">
   <attributes>
      <attr name="Name" value="Mail Server 1"/>
      <attr name="IPAddress" value="151.155.160.17"/>
      <attr name="Mailbox" value="1482"/>
   </attributes>
   </Object>
```

When the model loader loads, it loads the mail server file into an in-memory instance of that particular server type and it traverses through the inherited object class to do one of the following:
1. load in its config values data and store in the Mail Server memory object;
2. or, have a method on the MailServer file object that has auto-code that always pulls that data from some abstract embodiment of the Server object in memory.

Scenario #2

The following illustrates how such a relationship can be represented in the model XML files in the case where a concrete instance can choose NOT to inherit the shared data and thus stamp its own data:

```
Server File
   <Object name="Server" type="Server" abstract="true">
   <attributes>
      <attr name="ConfigValues" value="<huge blob of data>"/>
   </attributes>
   </Object>
MailServer File
   <Object name="MailServer1" type="MailServer" inherits="Server">
   <attributes>
      <attr name="ConfigValues" value="<its own blob of data>"/>
      <attr name="Name" value="Mail Server 1"/>
      <attr name="IPAddress" value="151.155.160.17"/>
      <attr name="Mailbox" value="1482"/>
      <attrSet inherit="Storage2" />
   </attributes>
   </Object>
```

In this case, the MailServer has its own ConfigValues, which overrides what is defined in the superclass. If the MailServer class didn't have the "inherits" declaration, then there would be no issue here. But, it's nice to have the option to still declare that inheritance if there is a need to inherit data from any other field. So, one can have mixed inheritance of data.

Deploying to Native Systems

Conventional approaches require that all information needed for an object is stamped on that object. The attribute sharing service solves this problem by have the "SharedAttribute" intelligence to be built into the deployment mechanism to break out shared attributes into to each separate concrete object and then deploy each object as a full object with all data.

Figure 2:
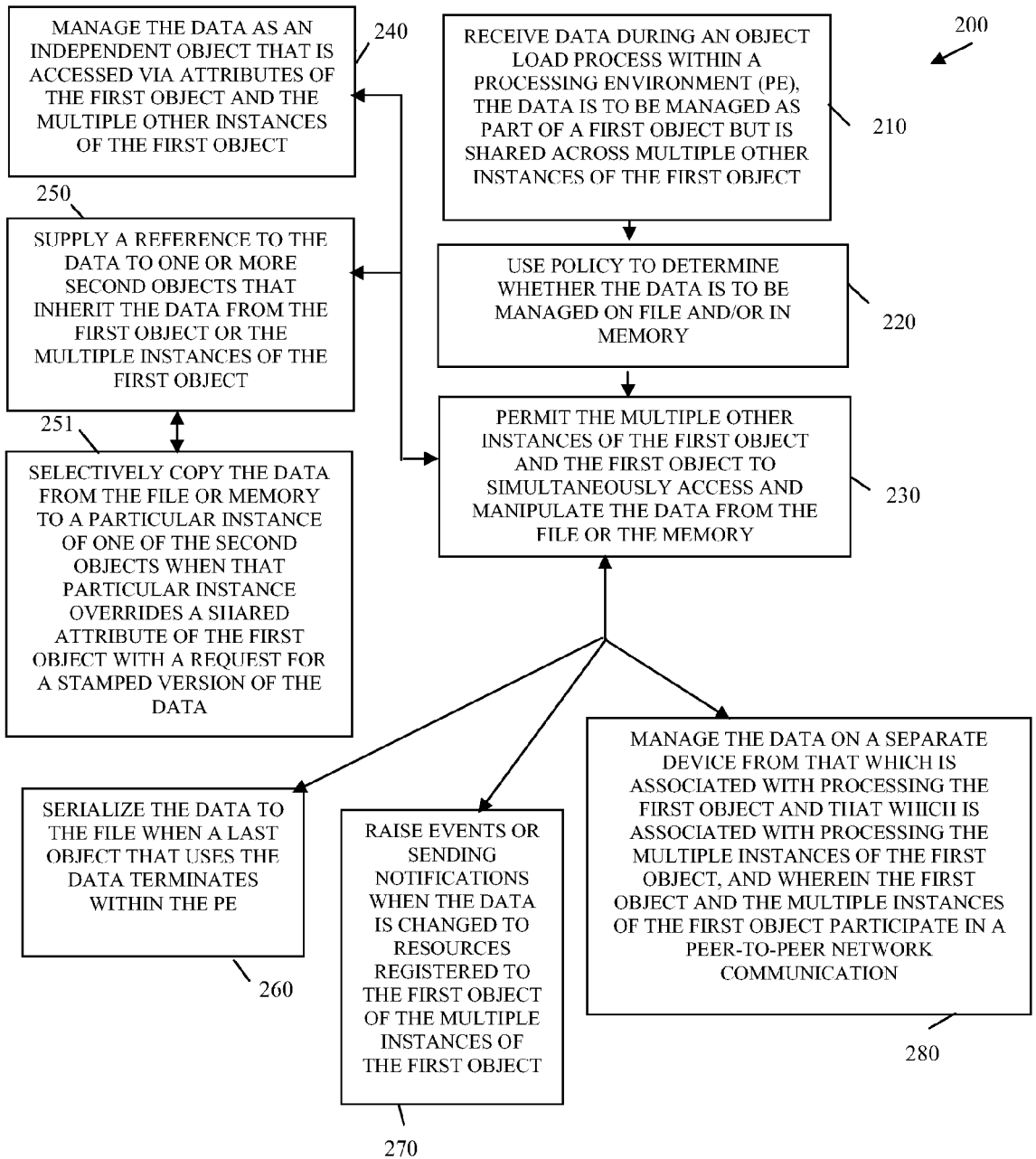
FIG. 2 is a diagram of another method for object attribute sharing, according to an example embodiment.

FIG. 2 is a diagram of another method 200 for object attribute sharing, according to an example embodiment. The method 200 (hereinafter "sharing service") is implemented as instructions in a machine-accessible and readable medium. The instructions when executed by a machine perform the processing depicted in the FIG. 2. The sharing service is also operational over and processes within a network. The network may be wired, wireless, or a combination of wired and wireless.

The sharing service represents a different perspective and in some cases enhanced perspective of the object sharing service represented by the method 100 of the FIG. 1.

At 210, the sharing service receives data during an object load process within a processing environment. The data is to be managed as part of a first object but is also to be shared across multiple other instances of the first object. Example declarations for achieving this in a particular XML embodiment were presented above with reference to the method 100 of the FIG. 1.

At 220, the sharing service uses policy to determine whether the data is to be managed on file (on disk) and/or in memory. In some cases, the policy may be included as a configuration parameter to the sharing service or may even be included as a profile with a particular resource or the sharing service. The data being shared can be managed on both disk and memory (such as cache, RAM, etc.). So, the data need not be exclusively one or the other although it can be if desired and if configured to be such.

At 230, the sharing service permits the multiple other instances of the first object and the first object to simultaneously access and manipulate the data from the file and/or the memory. References within the instances point to a central and shared location having the data. Moreover, the sharing service resolves references made to the data to the shared location having the data.

According to an embodiment, at 240, the sharing service manages the data as an independent object that is accessed via attributes of the first object and the multiple other instances of the first object. So, the shared data itself may be treated as an independent object having its own methods for access even when it is just really an attribute or component of multiple other objects.

In another case, at 250, the sharing service supplies a reference to the data to one or more second objects that inherit the data from the first object or the multiple other instances of the first object. This is a situation where hierarchical (parent-child) relationships exist and a second object is inheriting from the first object and thus inherits the shared data. Examples of this were presented in detail above with reference to the method 100 of the FIG. 1.

Continuing with the embodiment of 250 and at 251, the sharing service can also selectively copy the data from the file or memory to a particular instance of one of the second objects when that particular instance overrides a shared attribute of the first object with a request for a stamped version of the data. This is a case where the second object inherits from the first object but has a particular situation where the shared data is not desired, and in such a situation, the sharing service permits the shared data to be copied out and populated as a copy with that particular second object. Again, examples of this were presented above with reference to the method 100 of the FIG. 1.

In an embodiment, at 260, the sharing service serializes the data to the file when a last object that uses the data terminates within the processing environment. In other words, the data may be in memory, such as cache, during the lifecycle of the objects that use it and when the last remaining object terminates within the processing environment, the data is serialized to disk or file for permanent storage. In some cases, the data may be serialized to a directory or database.

In still another situation, at 270, the sharing service manages the data on a separate device from that which is associated with processing the first object and that which is associated with processing the other multiple instances of the first object. The first object and the instances participate in a peer-to-peer (P2P) network. So, the techniques discussed herein via the sharing service can be used in a P2P network as a mechanism to share data via a particular peer.

Figure 3:
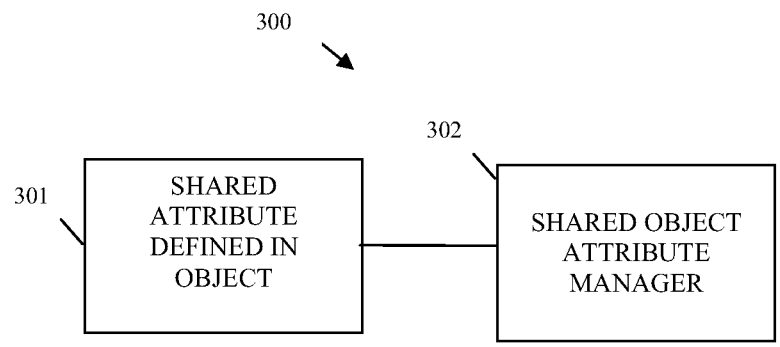
FIG. 3 is a diagram of an object attribute sharing system, according to an example embodiment.

FIG. 3 is a diagram of an object attribute sharing system 300, according to an example embodiment. The object attribute sharing system 300 is implemented as instructions on or within a computer-readable storage medium and a machine-accessible and readable medium. The instructions when executed by a machine (computer, etc.) perform various aspects of the processing depicted with respect to the method 100 of the FIG. 1 and the method 200 of the FIG. 2. The object attribute sharing system 300 is also operational over a network and the network may be wired, wireless, or a combination of wired and wireless.

The object attribute sharing system 300 includes a shared attributed 301 defined in an object and a shared attribute manager 302. Each of these components and their interactions with one another will now be discussed in turn.

The shared attribute 301 is implemented in a machine-accessible and computer-readable storage medium as part of a first object. The first object processes on a machine (such as a computer) of the network. Example aspects of the shared attribute 301, its definition and usage, were described in detail above with reference to the methods 100 and 200 of the FIGS. 1 and 2, respectively.

The shared attribute 301 is a portion of a first object and includes a specific type that identifies it as a shared attribute. This type permits the shared attribute 301 and its data to be treated in a manner that is different from that which is associated with other component pieces of the first object. Data populated to the shared attribute 301 is centrally stored, shared, and managed across multiple other objects that declare and use it.

The shared object attribute manager 302 is implemented in a machine-accessible and computer-readable storage medium as instructions that process on the machine or a different machine of the network. Example processing associated with the shared object attribute manager 302 was described in detail above with reference to the methods 100 and 200 of the FIGS. 1 and 2, respectively.

The shared object attribute manager 302 acquires data linked to the shared attribute 301 and populates the data to a central location that is separate and apart from other data associated with the first object. The data is managed and shared between the first object and other instances of the first object or other second objects of the network from the central location.

According to an embodiment, the shared object attribute manager 302 maintains the central location in memory of the machine and/or on disk that is interfaced to the machine.

In another situation, the shared object attribute manager 302 treats the data as an independent object that is concurrently accessed by the first object, the other instances of the first object, and the other second objects.

In a particular embodiment, the second objects inherit the data from the first object or from the other instances of the first object. In some situations, at least one of the second objects overrides the sharing aspect associated with the data and is thus permitted to receive its own independent copy of the data from the central location.

According to an embodiment, the shared object attribute manager 302 dynamically sends notifications to registered resources when changes are made to the data from the central location. So, resources can register for different types of notifications that are automatically sent when changes are made to the data in the central location.

Figure 4:
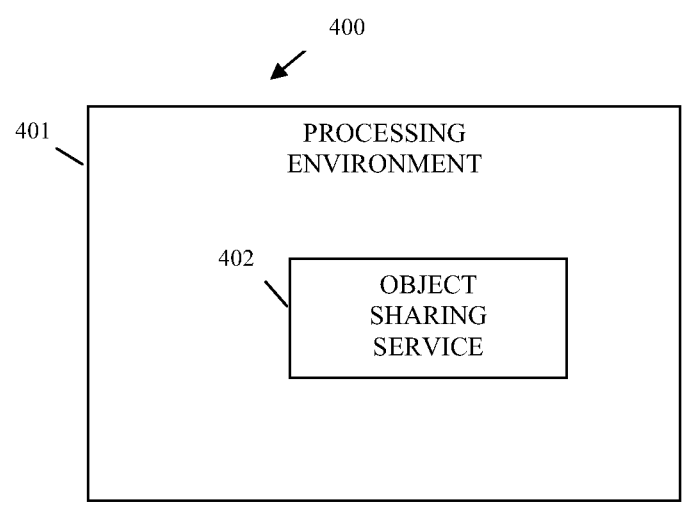
FIG. 4 is a diagram of another object attribute sharing system, according to an example embodiment.

FIG. 4 is a diagram of another object attribute sharing system 400, according to an example embodiment. The object attribute sharing system 400 is implemented as instructions on or within a machine-accessible and computer-readable storage medium. The instructions when executed by a machine (such as a computer) perform various aspects of the processing depicted with respect to the methods 100 and 200 of the FIGS. 1 and 2, respectively, and processing associated with the system 300 of the FIG. 3. The object attribute sharing system 400 is also operational over a network and the network may be wired, wireless, or a combination of wired and wireless.

The object attribute sharing system 400 includes a processing environment 401 and an object sharing service 402. Each of these components and their interactions with one another will now be discussed in turn.

The processing environment 401 is implemented in a machine-accessible and computer-readable storage medium. Also, the processing environment is interfaced to a network and includes one or more machines (processor and memory enabled devices). The processing environment 401 can be logically defined so that is spans multiple geographical locations or can be considered virtual. The processing environment 401 can also span multiple different operating systems.

In an embodiment, the processing environment 401 is logically assembled across multiple computers as a P2P collection of networks.

In some cases, the multiple objects are duplicate instances of one another that process within the processing environment 401. Moreover, some of the multiple objects can be inherited from other ones of the multiple objects.

The object sharing service 402 is implemented in a machine-accessible and computer-readable storage medium and is to process within the processing environment. Example processing associated with the object sharing service 402 was presented in detail above with reference to the method 100 and 200 of the FIGS. 1 and 2, respectively, and with respect to the system 300 of the FIG. 3.

The object sharing service 402 detects when objects are loaded and referenced within the processing environment 401 and watches for shared attributes of objects. Each shared attribute is populated with data and the data is managed from a central location within the processing environment 401. The central location is separate and apart from a particular location that is associated with other components of a particular object associated with that shared attribute. Again, the data is concurrently shared between multiple objects within the processing environment 401.

According to an embodiment, the object sharing service 402 includes a notification mechanism that notifies affected resources when the data is changed within the central location.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method for sharing data between objects, comprising:
    identifying, during a load process of a first object in a processing environment, a first attribute that is associated with shared data;
    loading the shared data into a separate location from that which is associated with remaining data for the first object that is being loaded and in response to the first attribute; and
    servicing a second object along with the first object with the shared data from the separate location while the first and second objects process, the shared data is not provided as copies to the first or the second objects and the shared data is provided as one copy that is managed and concurrently accessed from the separate location, and wherein said servicing includes sending a dynamic real time notification to a processing resource associated with the second object by sending a communication to said processing resource when the first object changes the shared data in the separate location during processing, and pushing said changes to said second object wherein the second object is a separate instantiation of a different version of the first object within the processing environment, and wherein the servicing further includes detecting changes to the shared data in the separate storage location that are made by the first object in a first language, and in response thereto dynamically translating the changes to a second language recognized by the second object, and wherein said pushing comprises pushing the translated changes dynamically in real time to the second object when the changes are made for immediate use by the second object.

2. The method of claim 1, wherein identifying further includes recognizing a shared attribute type assigned to the first attribute during the load process that identifies the shared data to be shared for the first object.

3. The method of claim 1, wherein loading further includes housing the shared data in memory associated with one or more devices.

4. The method of claim 1, wherein loading further includes storing the shared data on disk interfaced with one or more devices of a processing environment.

5. The method of claim 1, wherein servicing furthering includes recognizing the second object as a duplicate instance or separate instantiation of the first object within a processing environment.

6. A machine-implemented system, comprising:
    a shared attribute implemented in a machine-accessible and readable medium as part of a first object and a second object that processes on a machine of a network, and
    a shared object attribute manager implemented in a machine-accessible and readable medium and to process on the machine of the network;
    wherein the shared object attribute manager acquires data linked to the shared attribute and populates the data to a central location separate and apart from other data associated with the first object and the second object, and the shared object attribute manager sends dynamic real time notifications to registered processing resources by sending communications to the resources when changes are made to the data in the central location by the first object and pushes said changes to the second object, and wherein the data is managed and shared between the first object and the second object from the central location and wherein the data is maintained as one copy at the central location and the data is not provided as copies to the first object or the second objects, wherein the second object is a separate instantiation of a different version of the first object, and the shared object attribute manager dynamically translates changes made to the shared data in the separate location by the first object in a first language to a second language recognized by the second object, and wherein said pushing of changes comprises pushing said translated changes dynamically in real time to the second object when the changes are made by the first object.

7. The system of claim 6, wherein the shared object attribute manager maintains the central location in memory of the machine and/or on disk interfaced to the machine.

8. The system of claim 7, wherein the shared attribute object attribute manager treats the data as an independent object that is concurrently accessed by the first object and the second object.

9. The system of claim 7, wherein the second object inherits the data from the first object or other instances of the first object.

10. The system of claim 6, wherein the shared data comprises a first attribute having a shared attribute type that identifies the shared data to be shared with the first object.

* * * * *